United States Patent [19]

Nakagaki et al.

[11] Patent Number: 4,616,255

[45] Date of Patent: Oct. 7, 1986

[54] COLOR TELEVISION SIGNAL GENERATING APPARATUS HAVING CIRCUIT FOR REDUCING NOISE IN OUTPUT PRIMARY COLOR SIGNALS OF CAMERA TUBE HAVING COLOR-RESOLVING STRIPED FILTER

[75] Inventors: Shintaro Nakagaki, Fujisawa; Hiroshi Ichimura, Tokyo, both of Japan

[73] Assignee: Victor Company of Japan Ltd., Yokohama, Japan

[21] Appl. No.: 596,550

[22] Filed: Apr. 4, 1984

[30] Foreign Application Priority Data

Apr. 7, 1983 [JP]  Japan ................................. 58-61294

[51] Int. Cl.[4] ..................... H04N 9/083; H04N 9/64
[52] U.S. Cl. ........................................ 358/47; 358/36
[58] Field of Search ................. 358/36, 37, 39, 40, 358/43, 44, 47, 48

[56] References Cited

U.S. PATENT DOCUMENTS

| | | | |
|---|---|---|---|
| 4,009,334 | 2/1977 | Sypula | 358/36 |
| 4,041,528 | 8/1977 | Miyoshi et al. | 358/47 |
| 4,223,342 | 9/1980 | Tsuchiya et al. | 358/37 |
| 4,268,855 | 5/1981 | Takahashi | 358/36 |
| 4,277,800 | 7/1981 | Nakagaki et al. | 358/44 |
| 4,400,721 | 8/1983 | Macovski | 358/37 |
| 4,435,725 | 3/1984 | Nagao et al. | 358/36 |
| 4,558,353 | 12/1985 | Hirota | 358/36 |
| 4,563,704 | 1/1986 | Hirota | 358/36 |

FOREIGN PATENT DOCUMENTS 3009245  9/1980  Fed. Rep. of Germany .

Primary Examiner—James J. Groody
Assistant Examiner—Randall S. Svihla
Attorney, Agent, or Firm—Michael N. Meller

[57] ABSTRACT

A color television signal generating apparatus has a noise reduction circuit for reducing noise in output primary color signals of a camera tube which has a color-resolving striped filter. The noise reduction circuit operates so that the noise included in the color signals only consists of cosine terms of a first-order noise component when a white or magenta image is picked up by the camera tube.

5 Claims, 9 Drawing Figures

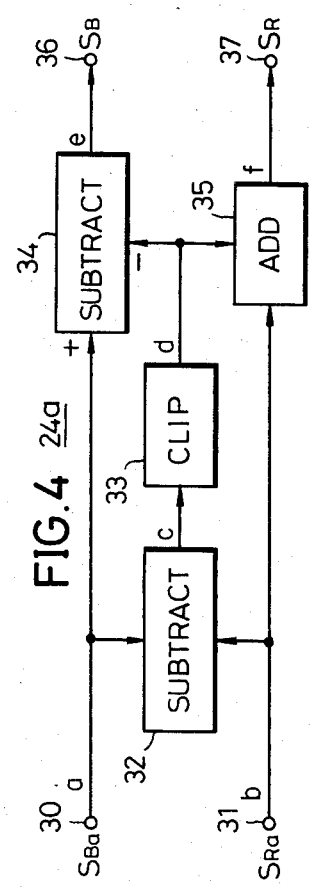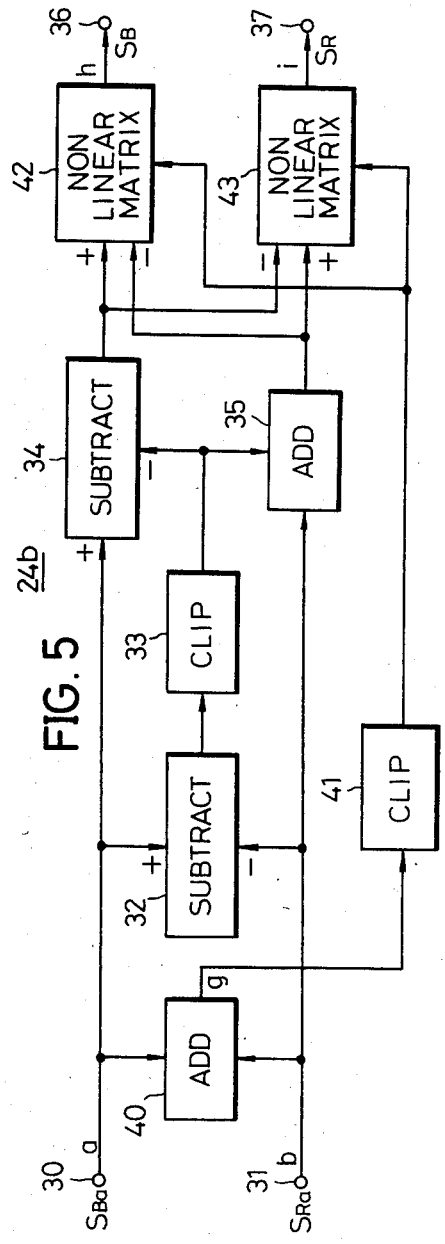

COLOR TELEVISION SIGNAL GENERATING APPARATUS HAVING CIRCUIT FOR REDUCING NOISE IN OUTPUT PRIMARY COLOR SIGNALS OF CAMERA TUBE HAVING COLOR-RESOLVING STRIPED FILTER

BACKGROUND OF THE INVENTION

The present invention generally relates to color television signal generating apparatuses having a noise reduction circuit, and more particularly to a color television signal generating apparatus having a noise reduction circuit which is designed to reduce noise in a signal obtained from a camera tube which is provided with a color-resolving striped filter.

A novel television signal generating apparatus employing a single camera tube which is provided with a color-resolving striped filter, was previously proposed in U.S. Pat. No. 4,041,528 entitled "COLOR TELEVISION SIGNAL GENERATING APPARATUS FOR USE IN A SINGLE CAMERA TUBE" in which the assignee is the same as the assignee of the present application. Further, an improved color television signal generating apparatus which has solved the problems of this previously proposed color television signal generating apparatus, was proposed in U.S. Pat. No. 4,277,800 entitled "COLOR TELEVISION SIGNAL GENERATING APPARATUS" in which the assignee is the same as the assignee of the present application, and this improved color television signal generating apparatus has been reduced to practice.

However, even in the latter improved color television signal generating apparatus, noise became a problem when an attempt was made to obtain a picture having a high picture quality with a satisfactory signal-to-noise ratio. Thus, it was desirable to reduce and suppress the noise. The noise became a problem especially when picking up an image of an object under a light source which has a low illumination.

SUMMARY OF THE INVENTION

Accordingly, it is a general object of the present invention to provide a novel and useful color television signal generating apparatus having a noise reduction circuit, in which the problems described heretofore have been eliminated.

Another object of the present invention is to provide a color television signal generating apparatus having a noise reduction circuit which is designed to reduce the noise in a signal which is obtained from a camera tube which has a color-resolving striped filter. According to the apparatus of the present invention, it is possible to obtain a color television signal in which the noise has been reduced and which has a large signal-to-noise ratio.

Still another and more specific object of the present invention is to provide a color television signal generating apparatus having a noise reduction circuit which comprises a first subtracting circuit for obtaining a difference signal of two demodulated color signals which are obtained from a color multiplexed carrier wave, a first amplitude limiting circuit for amplitude-limiting a noise component in the difference signal from the first subtracting circuit to a predetermined level, a first adder for obtaining an added signal of an output of the first amplitude limiting circuit and one of the demodulated color signals, and a second subtracting circuit for obtaining a difference signal of the output of the first amplitude limiting circuit and the other of the demodulated color signals. According to the noise reduction circuit in the color television signal generating apparatus of the present invention, the noise included in the color signal when a white or magenta image is picked up only consists of cosine terms in the first-order noise component. Thus, it is possible to improve the signal-to-noise ratio by 7 dB in total, and it is possible to obtain a picture of the same high picture quality as can be obtained when picking up a red or blue image.

A further object of the present invention is to provide a color television signal generating apparatus having the above noise reduction circuit, in which the noise reduction circuit further comprises a second adder for adding the two demodulated color signals, a second amplitude limiting circuit for amplitude-limiting an output signal of the second adder to a predetermined level, and non-linear matrix circuit means supplied with the output signals of the second subtracting circuit and the first adder, for performing subtracting operations with subtracting quantities varied according to an output control signal of the second amplitude limiting circuit. According to the noise reduction circuit in the color television signal generating apparatus of the present invention, it is possible to suppress the color mixture ratio of the output color signal when picking up an image under a low illumination, and for this reason, it is possible to obtain a picture having a higher picture quality. Moreover, when picking up a white image, it is possible to reduce the color mixture ratio from a point when the input signal level is extremely small. Therefore, the waveform distortion which occurs when the white image is picked up under a low illumination due to non-linearity, can be suppressed to the value at −12 dB of the peak-to-peak value of the noise component.

Other objects and further features of the present invention will be apparent from the following detailed description when read in conjunction with the accompanying drawings.

BRIEF DESCRIPTION OF THE DRAWINGS

FIG. 4 is a systematic block diagram showing a first embodiment of a noise reduction circuit in the apparatus shown in FIG. 1;

FIG. 5 is a systematic block diagram showing a second embodiment of a noise reduction circuit in the apparatus shown in FIG. 1;

DETAILED DESCRIPTION

Figure 1:
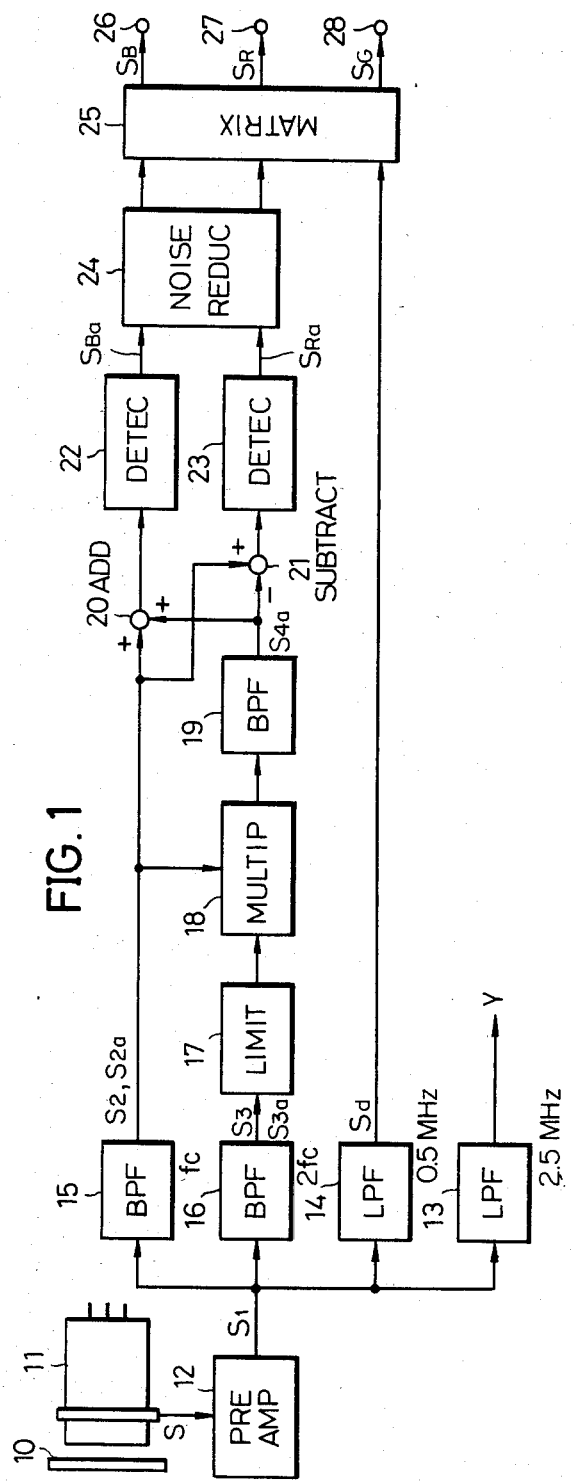
FIG. 1 is a systematic block diagram showing an embodiment of a color television signal generating apparatus according to the present invention.

In FIG. 1, a light from an image which is to be picked up, is passed through an optical system (not shown) of a single-tube type color television camera, and the image is formed on a photoconductive screen of a camera tube 11 through a color-resolving striped filter 10.

Figure 2:
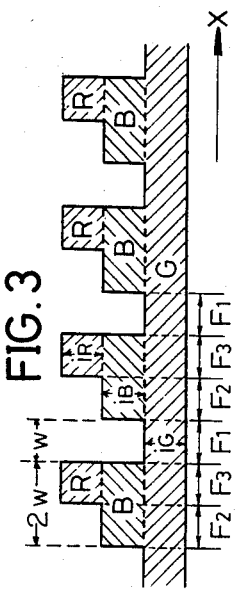
FIG. 2 is an enlarged, fragmentary frontal view showing an example of a color-resolving striped filter employed in the apparatus shown in FIG. 1.

As shown in FIG. 2, the color-resolving striped filter 10 is made up of first, second, and third filter stripes F1, F2, and F3 of equal widths w. Each stripe has an oblong, narrow shape in the vertical direction. The stripes are laid consecutively and contiguously in the order stated above, stripes F1, F2, and F3 constituting one group. A plurality of such groups are, laid consecutively and contiguously side-by-side in a single plane. These filter stripes F1, F2, and F3, of all groups, extend in the direction (direction Y in FIG. 1) which is perpendicular to the horizontal scanning direction (direction X in FIG. 1). The stripes are arrayed in an orderly manner in the above-mentioned sequence, and all filter stripes have the same space frequency. The light-transmitting characteristics respectively of these filter stripes F1, F2, and F3 are as follows. The first filter stripe F1 is adapted to transmit light of one primary color from among the three primary colors (red, green, and blue) of an addition mixture color. The second filter stripe F2 is adapted to transmit light of mixed colors of the primary color transmitted through the first filter stripe F1 and one of the two remaining primary colors (i.e. not the primary color transmitted through the first filter stripe F1). The third filter stripe F3 is adapted to transmit the light of all colors (e.g. white light).

More specifically, the second filter stripe F2 is capable of transmitting light of colors respectively having the following relationships, depending on whether the primary color transmitted through the first filter stripe F1 is red, green, or blue.

TABLE

| Primary color light transmitted through first filter stripe F1 | Color of light transmitted through second filter stripe F2 |
| --- | --- |
| Red light | Magenta (red blue) or yellow (red green) |
| Green light | Yellow (red green) or cyan (blue green) |
| Blue light | Magenta (red blue) or cyan (blue green) |

In one example of a color-resolving striped filter 10 of the above-described organization, the first filter stripe F1 has a transmission characteristic to transmit green light (G). The second filter stripe F2 has a transmission characteristic to transmit the light of a mixture color of blue light (B) and green light (G) (that is, cyan (C)). The third filter stripe F3 has a transmission characteristic to transmit the light of all colors, that is, white light (W) or a mixed color light of red light (R), green light (G), and blue light (B).

Figure 3:
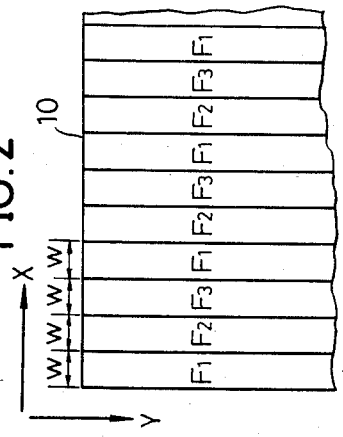
FIG. 3 is a diagram for explaining an energy distribution of transmitted light when white light is projected onto the color-resolving striped filter shown in FIG. 2.

The energy state of the light transmitted when the white light (W) is projected onto the color-resolving striped filter 10, is as illustrated by one example in FIG. 3, in which the horizontal direction (X-axis direction) represents energy distribution. In other words, the green light (G) is continuously distributed since it is transmitted through all filter stripes F1, F2, and F3. The blue light (B) is distributed over a width 2w separated by space intervals of w, since it only passes through the filter stripes F2 and F3. The red light (R) is distributed over a width w separated by space intervals of 2w, since it is only transmitted through the filter stripe F3.

If it is assumed that the above color-resolving striped filter is used and a white light image is introduced as incident light, an output signal S obtained from the camera tube 11 can be represented as a fundamental wave component having a fundamental repetitive period described by the pitch of the respective stripes of the color-resolving striped filter.

The output signal S can be described by an equation $S = S_d + S_h$, where the signal $S_d$ is a direct wave component (DC component) signal comprising a mixture of a luminance signal Y, a green light signal $S_G$, a blue light signal $S_B$, and a red light signal $S_R$.

The signal $S_h$ is a high-band component (AC component) signal comprising a group of modulated color signals having forms resulting from amplitude modulation of a specific carrier wave and other carrier waves with a mixture signal. The specific carrier wave has a frequency which is the same as the space frequency determined by the number of groups of filter stripes F1, F2, and F3 of the color-resolving striped filter 10. The other carrier waves have frequencies which are the same as higher harmonics of the specific carrier wave. The mixture signal is made up of two primary color lights other than the primary color light (which is the green color light in the instant example) passing through the first filter stripe F1.

The output signal S of the camera tube 11 is amplified by a preamplifier 12. Then, it is supplied to lowpass filters 13 and 14 and to bandpass filters 15 and 16. The lowpass filter 13 has a filtering characteristic in which the upper limit cutoff frequency $f_y$ is approximately 2.5 MHz. A luminance signal Y is derived from the output signal of the lowpass filter 13. The lowpass filter 14 has a filtering characteristic in which the upper limit cutoff frequency $f_d$ is approximately 0.5 MHz. The direct signal $S_d$ described before is derived from the output signal of the lowpass filter 14.

An output signal $S_1$ of the preamplifier 12 can be described by the following equation (1).

$$S_1 = (i_G + 2i_B/3 + i_R/3) + A\sin(\omega t + \phi) + (A/2)\sin(2\omega t - \phi) \quad (1)$$

where $$A = (-\sqrt{3}/\pi)(i_B^2 + i_B i_R + i_R^2)^{\frac{1}{2}}$$

$$\phi = \tan^{-1}[(i_B - i_R)/\sqrt{3}\,(i_B + i_R)]$$

and $\omega = 2\pi f_c$ (where $f_c$ is a space frequency determined by three filter stripes of the color-resolving striped filter 10).

The waveform of the output signal $S_1$ of the preamplifier 12 with the characteristics of the degree of modulation of the camera tube 11 in the ideal state of 100% for all frequencies, becomes as shown in FIG. 3, and the levels become $i_G$ for the filter stripe F1, $(i_G + i_B)$ for the filter stripe F2, and $(i_G + i_B + i_R)$ for the filter stripe F3. These levels $i_G$, $i_B$, and $i_R$ correspond to the necessary three primary color signals.

The bandpass filter 15 passes the frequency $f_c$ and frequency components in the vicinity thereof, while the bandpass filter 16 passes the frequency $2f_c$ and frequency components in the vicinity thereof. Accordingly, a fundamental wave component signal $S_2$ is obtained from the bandpass filter 15, and a second harmonic component signal $S_3$ is obtained from the bandpass filter 16. These signals $S_2$ and $S_3$ can be described by the following equations (2) and (3).

$$S_2 = A\sin(\omega t + \phi) \tag{2}$$

$$S_3 = (A/2) \sin (2\omega t - \phi) \tag{3}$$

If it is assumed that a fundamental wave band noise (hereinafter simply referred to as primary noise) is $E_{n1}\sin\omega_{n1}t$ and a second harmonic band noise (hereinafter simply referred to as secondary noise) is $E_{n2}\sin\omega_{n2}t$, outputs signals $S_{2a}$ and $S_{3a}$ of the respective bandpass filters 15 and 16, for the case where the noise is taken into consideration, can respectively be described by the following equations (4) and (5).

$$S_{2a} = A[1 + X_1 \cos(\phi t + \omega_{n1}t)] \sin[\omega t + \phi - X_1 \sin(\omega t + \phi - \omega_{n1}t)] \tag{4}$$

$$S_{3a} = (A/2)[1 + X_2 \cos(2\omega t - \phi - \omega_{n2}t)] \sin[2\omega t - \phi - X_2 \sin(2\omega t - \phi - \omega_{n2}t)] \tag{5}$$

where $X_1 = E_{n1}/A$ and $X_2 = E_{n2}/(A/2)$.

The output signal $S_{3a}$ of the bandpass filter 16 is supplied to an amplitude limiter 17 wherein the signal $S_{3a}$ is amplitude-limited to a predetermined amplitude. The signal $S_{2a}$ and an output signal of the amplitude limiter 17 are supplied to a multiplier 18 wherein the two signals are multiplied. An output signal of the multiplier 18 is supplied to a bandpass filter 19, and this bandpass filter 19 produces a new fundamental wave component signal $S_{4a}$ of a different phase. This signal $S_{4a}$ can be described by the following equation (6).

$$S_{4a} = (A/2)[1 + X_1 \cos(\omega_{c1}t + \phi)] \cos[\omega t - 2\phi + X_1 \sin(\omega_{c1}t + \phi) - X_2 \sin(\omega_{c1}t - \phi)] \tag{6}$$

The signal $S_{4a}$ from the bandpass filter 19 and the signal $S_{2a}$ from the bandpass filter 15 are supplied to an adder 20 wherein the two signals $S_{4a}$ and $S_{2a}$ are added. A detector 22 detects an output signal of the adder 20, and produces a blue signal $S_{Ba}$ (signal a shown in FIG. 6(A)). On the other hand, the signal $S_{4a}$ from the bandpass filter 19 and the signal $S_{2a}$ from the bandpass filter 15 are supplied to a subtracting circuit 21 wherein a subtraction takes place between the two signals $S_{4a}$ and $S_{2a}$. A detector 23 detects an output signal of the subtracting circuit 21, and produces a red signal $S_{Ra}$ (signal b shown in FIG. 6(B)). These blue and red signals $S_{Ba}$ and $S_{Ra}$ can be described by the following equations (7) and (8).

$$S_{Ba} = \sqrt{2} A_a[1 + X_1\cos(\omega_{c1}t + \phi)] \cdot [1 + \sin3\phi - \{2X_1\sin(\omega_{c1}t + \phi) - X_2\sin(\omega_{c2}t - \phi)\}\cos3\phi]^{\frac{1}{2}} \tag{7}$$

$$S_{Ra} = \sqrt{2} A_a[1 + X_1\cos(\omega_{c1}t + \phi)] \cdot [1 - \sin3\phi + \{2X_1\sin(\omega_{c1}t + \phi) - X_2\sin(\omega_{c2}t - \phi)\}\cos3\phi]^{\frac{1}{2}} \tag{8}$$

where $$A_a = -A = (\sqrt{3}/\pi)(i_B^2 + i_Bi_R + i_R^2)^{\frac{1}{2}}$$

$$\omega_{c1}t = \omega t - \omega_{n1}t$$

and $$\omega_{c2}t = 2\omega t - \omega_{n2}t.$$

From the above equations (7) and (8), it may be seen that the effect of the secondary noise $E_{n2}\sin\omega_{c2}t$ is the largest when picking up a white or magenta image (that is, when $\phi = 0°$), and that there is no effect when picking up a blue or red image (that is, when $\phi = \pm 30°$).

The signals $S_{Ba}$ and $S_{Ra}$ which are obtained when picking up the white or magenta image, that is, under the condition in which there is the largest effect of the secondary noise $E_{n2}\sin\omega_{c2}t$, can be obtained by substituting $\phi = 0°$ in the equations (7) and (8) so as to obtain the following equations (9) and (10).

$$S_{Ba} = \sqrt{2} A_a - \sqrt{2} E_{n1}(\cos\omega_{c1}t - \sin\omega_{c1}t) - \sqrt{2} E_{n2}\sin\omega_{c2}t \tag{9}$$

$$S_{Ra} = \sqrt{2} A_a - \sqrt{2} E_{n1}(\cos\omega_{c1}t + \sin\omega_{c1}t) + \sqrt{2} E_{n2}\sin\omega_{c2}t \tag{10}$$

As may be seen from the equations (9) and (10), the signals $S_{Ba}$ and $S_{Ra}$ each comprise a sine component and a cosine component with respect to the primary noise component $E_{n1}\sin\omega_{c1}t$, and only the signs of the sine components are mutually opposite between the signals $S_{Ba}$ and $S_{Ra}$. With respect to the secondary noise $E_{n2}\sin\omega_{c2}t$, the signals $S_{Ba}$ and $S_{Ra}$ each comprise a sine component, and the signs of the sine components are mutually opposite between the signals $S_{Ba}$ and $S_{Ra}$.

In the color television signal generating apparatus according to the present invention, these relationships between the sine and cosine components of the signals $S_{Ba}$ and $S_{Ra}$ are noted, so as to suppress the noise component included in the signals $S_{Ba}$ and $S_{Ra}$ which are described by the equations (9) and (10). Description will now be given with respect to a noise reduction circuit which constitutes an essential part of the apparatus according to the present invention. The output signals $S_{Ba}$ and $S_{Ra}$ of the respective detectors 22 and 23 are supplied to a noise reduction circuit 24 wherein the noise is reduced as will be described hereinafter.

A first embodiment of the noise reduction circuit is shown as a noise reduction circuit 24a in FIG. 4. The output signal $S_{Ba}$ of the detector 22 shown in FIG. 1 is supplied to subtracting circuits 32 and 34, through a terminal 30 shown in FIG. 4. On the other hand, the output signal $S_{Ra}$ of the detector 23 shown in FIG. 1 is supplied to the subtracting circuit 32 and an adder 35, through a terminal 31 shown in FIG. 4.

Figure 6:
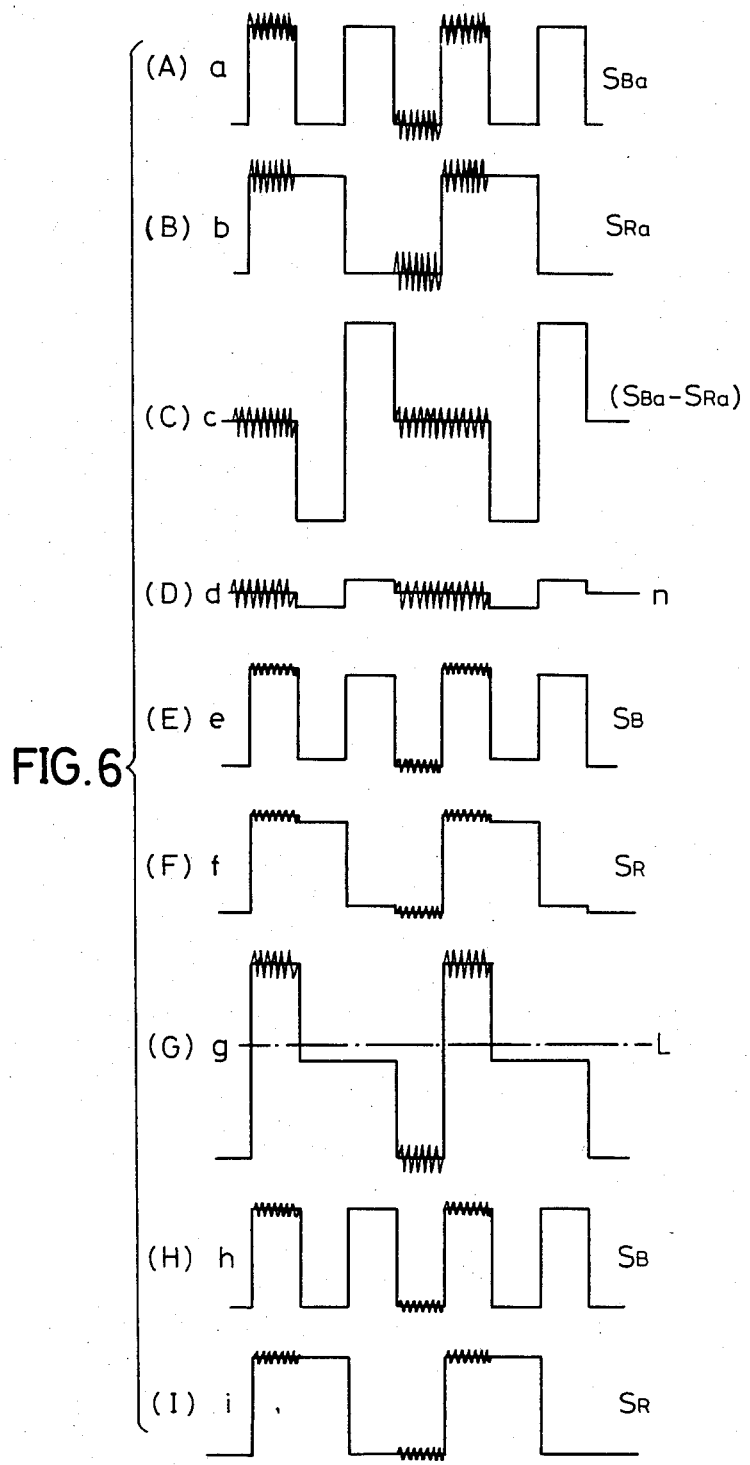
FIGS. 6(A) through 6(I) show signal waveforms at each part of the noise reduction circuits shown in FIGS. 4 and 5.

A subtraction is performed in the subtracting circuit 32, between the signals $S_{Ba}$ and $S_{Ra}$ which respectively have the waveforms a and b shown in FIGS. 6(A) and 6(B). A subtracted signal having a waveform c shown in FIG. 6(C) is obtained from the subtracting circuit 32. The subtracted signal c is supplied to a clipping circuit 33, wherein the signal c is clipped to a peak-to-peak value of the noise component and is formed into a noise signal n having a waveform d shown in FIG. 6(D). This noise signal n can be described by the following equation (11) by using the equations (9) and (10).

$$n = (S_{Ba} - S_{Ra})/2 \tag{11}$$

-continued $$= \sqrt{2}\, E_{n_1}\sin\omega_{c_1}t - \sqrt{2}\, E_{n_2}\sin\omega_{c_2}t$$

The noise signal n from the clipping circuit 33 and the signal $S_{Ba}$ from the terminal 30 are supplied to the subtracting circuit 34 wherein a subtraction is performed between these two signals n and $S_{Ba}$. As a result, a signal $S_B$ having a waveform e shown in FIG. 6(E) is obtained from the subtracting circuit 34. This signal $S_B$ can be described by the following equation (12).

$$S_B = S_{Ba} - n \tag{12}$$

$$= \sqrt{2}\, A_a - \sqrt{2}\, E_{n_1}\cos\omega_{c_1}t$$

The noise signal n from the clipping circuit 33 and the signal $S_{Ra}$ from the terminal 31 are supplied to the adder 35 wherein the two signals n and $S_{Ra}$ are added. Thus, a signal $S_R$ having a waveform f shown in FIG. 6(F) is obtained from the adder 35. This signal $S_R$ can be described by the following equation (13).

$$S_R = S_{Ra} + n \tag{13}$$

$$= \sqrt{2}\, A_a - \sqrt{2}\, E_{n_1}\cos\omega_{c_1}t$$

As may be seen from the equations (12) and (13), the blue and red signals $S_B$ and $S_R$ only comprise the primary noise component, compared with the signals $S_{Ra}$ and $S_{Ba}$ which are described by the equations (9) and (10) and comprise both the primary and secondary noise components, and only the cosine terms remain with respect to the primary noise component in these blue and red signals $S_B$ and $S_R$. Therefore, the signal-to-noise (S/N) ratio is improved by 3 dB. Further, because the term is zero with respect to the secondary noise component in the blue and red signals $S_B$ and $S_R$, the effect of the secondary noise can also be eliminated when picking up the white or magenta image, as in the case when picking up a blue or red image. Hence, the noise in the demodulated color signal can be reduced by 4 dB. Accordingly, since the effect of the primary noise can be reduced by 3 dB and the effect of the secondary noise can be reduced by 4 dB, the S/N ratio can be improved in total by 7 dB.

The output signals of the subtracting circuit 34 and the adder 35 are obtained through respective output terminals 36 and 37, and are supplied to a matrix circuit 25 shown in FIG. 1 together with the signal $S_d$ from the lowpass filter 14. The three signals supplied to the matrix circuit 25 are subjected to a matrix processing. The blue, red, and green signals $S_B$, $S_R$, and $S_G$ in which the noise has been greatly reduced, are obtained from respective output terminals 26, 27, and 28 of the matrix circuit 25.

The noise signal n shown in FIG. 6(D), which is obtained from the clipping circuit 33, also includes a color signal component (a low-frequency component indicated by a square wave which is illustrated by a solid line in the waveform shown in FIG. 6(D)) corresponding to the peak-to-peak value of the noise component. For this reason, this color signal component is included in the output signals e and f shown in FIGS. 6(E) and 6(F) of the respective subtracting circuit 34 and the adder 35, due to the subtraction and the addition in the subtracting circuit 34 and the adder 35. As may be seen by comparing FIGS. 6(E) and 6(F) with FIGS. 6(A) and 6(B), the square wave part other than the noise component in the signals e and f is partly different from the corresponding square wave part in the respective signals a and b. This difference between the respective square wave parts appears as a color mixture. The color mixture quantity is in the range of $-6$ dB in the worst case, because the noise signal n is $\frac{1}{2}$ the difference signal $(S_{Ba} - S_{Ra})$ as indicated in the equation (11) and the clipping circuit 33 clips the signal to the peak-to-peak value of the noise component. Thus, the effect of the color mixture is negligible when picking up an image under a normal condition. However, when picking up an image under a low illumination light source by increasing the sensitivity, the effect of the color mixture is no longer negligible since the level of the color signal is relatively small compared to the level of the noise component.

Next, description will be given with respect to an embodiment of the invention, according to which the color signal can be obtained without being greatly affected by the color mixture. FIG. 5 shows the block system of a noise reduction circuit 24b which is a second embodiment of the noise reduction circuit 24 shown in FIG. 1. In FIG. 5, those parts which are the same as those corresponding parts in FIG. 4 are designated by the same reference numerals, and their description will be omitted.

The signal $S_{Ba}$ from the terminal 30 is supplied to the subtracting circuits 32 and 34, as in the case of the first embodiment described previously, and is also supplied to an adder 40. The signal $S_{Ra}$ from the terminal 31 is similarly supplied to the subtracting circuit 32 and the adder 35, as in the case of the first embodiment, and is also supplied to the adder 40. The signals $S_{Ba}$ and $S_{Ra}$ are added in the adder 40, and are formed into a signal having a waveform g shown in FIG. 6(G). The output signal of the adder 40 is supplied to a clipping circuit 41 wherein the signal is clipped to a predetermined clipping level L, which is indicated by a one-dot chain line in FIG. 6(G), and the signal part which is greater than the clipping level L is eliminated. An output signal of the clipping circuit 41 is applied to non-linear matrix circuits 42 and 43 as a control signal. The clipping level L of the clipping circuit 41 is set to the same level (the peak level of the positive polarity part of the noise component) to which the positive polarity part of the noise component is clipped in the clipping circuit 33.

The non-linear matrix circuit 42 is supplied with the signal $S_B$ from the subtracting circuit 34 and the signal $S_R$ from the adder 35, and performs an operation $(S_B - S_R)$. In this state, the quantity of the signal $S_R$ is controlled by the control signal g from the clipping circuit 41. Similarly, the non-linear matrix circuit 43 is supplied with the signal $S_R$ from the adder 35 and the signal $S_B$ from the subtracting circuit 34, and performs an operation $(S_R - S_B)$. The quantity of the signal $S_B$ is controlled by the control signal g from the clipping circuit 41.

Figure 7:
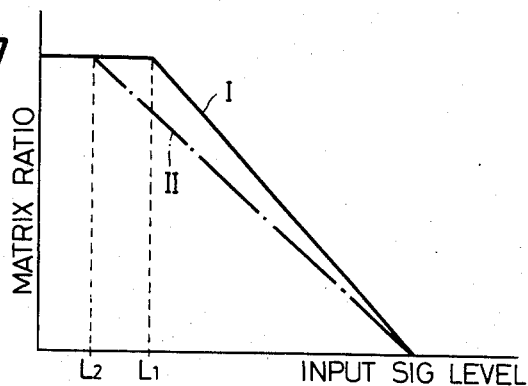
FIG. 7 is a graph showing the operating characteristic of non-linear matrix circuits in the circuit shown in FIG. 5.

The operating characteristic of the non-linear matrix circuits 42 and 43 is shown in FIG. 7. When picking up a color image, in a case where the input signal level is lower than a peak level $L_1$ of the noise component as indicated by a solid line I, the control signal from the clipping circuit 41 has not reached the clipping level L shown in FIG. 6(G), and the matrix ratio is controlled to become constant. In other words, the quantity of the signal $S_R$ in the signal $(S_B-S_R)$ and the quantity of the signal $S_B$ in the signal $(S_R-S_B)$ respectively are in a constant ratio with respect to the input signal level. In a case where the input signal level is higher than the peak level $L_1$, the control signal from the clipping circuit 41 assumes a level greater than the clipping level L, and the matrix ratio is controlled to decrease. That is, the quantities of the signals $S_B$ and $S_R$ are respectively controlled to assume a constant value with respect to the input signal level.

On the other hand, when picking up a white image, in a case where the input signal level is lower than a level $L_2$ which is lower than the peak level $L_1$ of the noise component as indicated by a one-dot chain line II in FIG. 7, the control signal from the clipping circuit 41 has not reached the clipping level L, and the matrix ratio is controlled to become constant. Further, in a case where the input signal level is higher than the level $L_2$, the control signal from the clipping circuit 41 assumes a level greater than the clipping level L, and the matrix ratio is controlled to decrease.

Accordingly, it is possible to respectively suppress the color mixture ratio of the red signal $S_R$ with respect to the blue signal $S_B$ and the color mixture ratio of the blue signal $S_B$ with respect to the red signal $S_R$, when picking up an image under a low illumination. Moreover, because the subtracting quantities are reduced from the point when the input signal level is lower than the level $L_2$ and are extremely small when picking up a white image, the waveform distortion which occurs when the white image is picked up under the low illumination due to non-linearity, can be suppressed to the value at $-12$ dB of the peak-to-peak value of the noise component.

The blue signal $S_B$ and the red signal $S_R$ are obtained from the respective non-linear matrix circuits 42 and 43. The blue signal $S_B$ and the red signal $S_R$ have respective waveforms h and i shown in FIGS. 6(H) and 6(I). As shown in FIGS. 6(H) and 6(I), the signals h and i have reduced noise and include no waveform distortion, that is, have no color mixture. The blue signal $S_B$ and the red signal $S_R$ from the non-linear matrix circuits 42 and 43 are respectively obtained through the output terminals 36 and 37.

Figure 8:
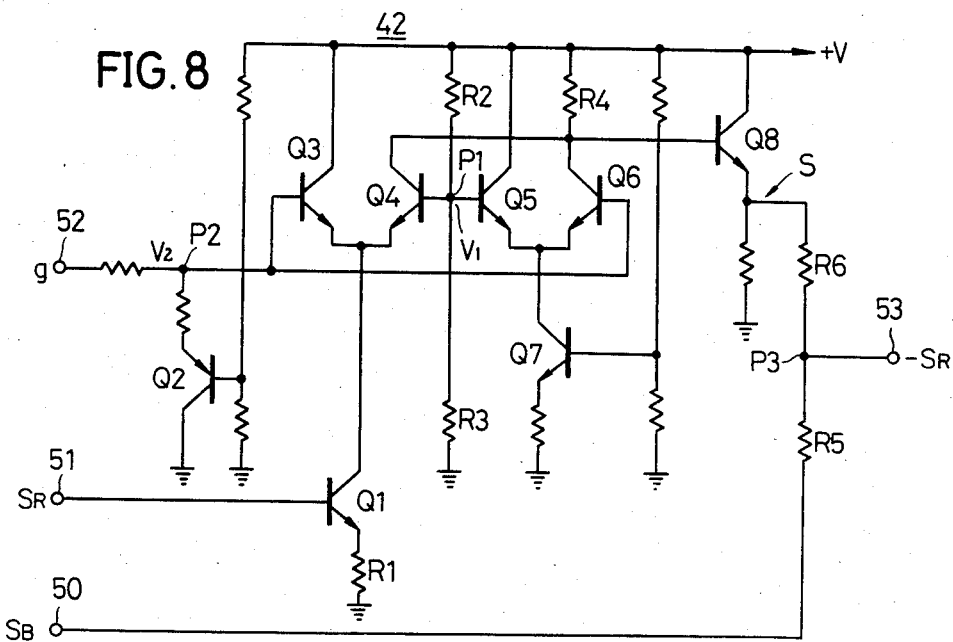
FIG. 8 is a circuit diagram showing an embodiment of a non-linear matrix circuit.

A concrete embodiment of the non-linear matrix circuit 42 is shown in FIG. 8. In FIG. 8, the blue signal $S_B$ from the subtracting circuit 34 is applied to a terminal 50, the red signal $S_R$ from the adder 35 is applied to a terminal 51, and the control signal from the clipping circuit 41 is applied to a terminal 52. The red signal $S_R$ from the terminal 51 is applied to a base of a transistor Q1 which has its emitter grounded through a resistor R1. A collector of a transistor Q2 is grounded, and the control signal from the terminal 52 is applied to an emitter of this transistor Q2 through a resistor. This transistor Q2 compresses the control signal (distorts the waveform) so as to make the matrix ratio a predetermined non-linear ratio which is other than 1:1. Transistors Q3 through Q6 constitute a level adjusting circuit. Bases of the transistors Q4 and Q5 are coupled, and resistors R2 and R3 are respectively coupled to a connection point between the bases of the transistors Q4 and Q5. Collectors of the transistors Q4 and Q6 and a base of a transistor Q8 are mutually coupled, and a connection point between the collectors of the transistors Q4 and Q6 and the base of the transistor Q8 is coupled to a resistor R4.

When the input signal level is lower than the level $L_1$, the resistances of the resistors $R_2$ and $R_3$ and a voltage $V_2$ at a point $P_2$ are set so that a relation $V_2 < V_I$ exists between a voltage $V_1$ at a point $P_1$ which is determined by a voltage dividing ratio of the resistors R2 and R3, and the voltage $V_2$ at the point $P_2$ which is determined by the value of the D.C. component in the control signal. In this state, the transistors Q3 and Q6 assume cutoff states. The output signal S of the level adjusting circuit, which is obtained from an emitter of the transistor Q8, can thus be described by the following equation.

$$S \cong -(R4/R1)S_R$$

Because the resistances of the resistors R1 and R4 are constant, a signal which has been multiplied by a constant ratio is obtained from the transistor Q8. The signal $S_B$ from the terminal 50 and the signal $-(R4/R1)S_R$ from the transistor Q8 are passed through respective resistors R5 and R6, and are added at a point $P_3$. As a result, a constant signal representing the subtracting quantity $S_R$ in the subtracted value $(S_B - S_R)$ is obtained through an output terminal 53.

On the other hand, when the input signal level is lower than the level $L_1$, the transistor Q3 is turned ON. Thus, the signal S which is obtained from the transistor Q8 in this case can be described by the following equation.

$$S \cong -K(R4/R1)S_R$$

In the above equation, K assumes a value between 0 and 1, and the value of K decreases from 1 to 0 as the base voltage of the transistor Q3 increases. Accordingly, the matrix ratio decreases as shown in FIG. 7 as the input signal level increases.

The non-linear matrix circuit 43 has the same circuit construction as the non-linear matrix circuit 42 shown in FIG. 8. However, in the case of the non-linear matrix circuit 43, the difference from the non-linear matrix circuit 42 is that the red signal $S_R$ is applied to the terminal 50 and the blue signal $S_B$ is applied to the terminal 51.

Figure 9:
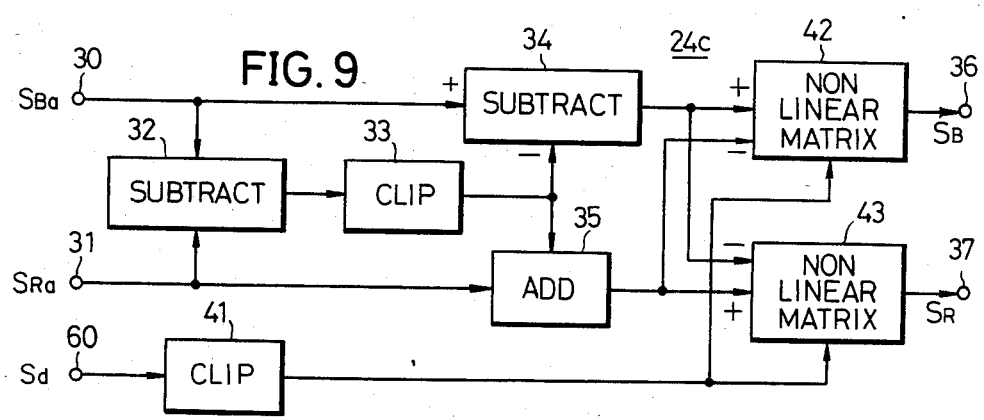
FIG. 9 is a systematic block diagram showing a third embodiment of a noise reduction circuit in the apparatus shown in FIG. 1.

In the second embodiment shown in FIG. 5, the control signal with respect to the non-linear matrix circuits 42 and 43, which is obtained from the clipping circuit 41, is also obtained from the added signal of the signals $S_{Ba}$ and $S_{Ra}$. For this reason, a slight noise component is mixed into this control signal. A noise reduction circuit 24c shown in FIG. 9 is a third embodiment of the noise reduction circuit 24 shown in FIG. 1, according to which the non-linear matrixing can be performed more satisfactorily without being affected by the above noise component in the control signal. In FIG. 9, those parts which are the same as those corresponding parts in FIGS. 4 and 5 are designated by the same reference numerals, and their description will be omitted.

In this third embodiment, the adder 40 which was employed in the second embodiment described previously, is not employed. The signal $S_d$ from the lowpass filter 14 shown in FIG. 1 is applied to a terminal 60. This signal $S_d$ is clipped in the clipping circuit 41, and the output of the clipping circuit 41 is supplied to the non-linear matrix circuits 42 and 43 as a control signal. According to the present embodiment, the control signal with respect to the non-linear matrix circuits 42 and 43 is obtained from the signal $S_d$. For this reason, the circuit is less affected by the noise, and it is possible to perform a more satisfactory non-linear matrixing.

Further, the present invention is not limited to these embodiments, but various variations and modifications may be made without departing from the scope of the present invention.

What is claimed is:

1. A color television signal generating apparatus comprising:
    a color-resolving striped filter comprising a plurality of groups of filter stripes, said groups being disposed in parallel and consecutively in a sequentially repeated arrangement, each of said groups comprising first, second and third filter stripes, said first filter stripe having a light transmission characteristic for transmitting the light of one of three additive primary colors, said second filter stripe having a light transmission characteristic for transmitting the light of a mixed color which includes said one of the three additive primary colors and another of the remaining two additive primary colors, and said third filter stripe being transparent and transmitting white light, said first, second and third filter stripes being arranged in parallel and consecutively in a predetermined sequence;
    a camera tube having said color-resolving striped filter disposed on the front surface thereof, said camera tube having a scanning electron beam of predetermined scanning speed;
    first separating means for separating and deriving, from an output signal of the camera tube, a fundamental component in which a carrier having a frequency equal to a space frequency being determined by the pitch of said groups of filter stripes in said color-resolving striped filter is amplitude-modulated;
    second separating means for separating and deriving, from the output signal of the camera tube, a second order harmonic component in which a carrier having a frequency twice the space frequency is amplitude-modulated;
    multiplying means for multiplying an output signal of said first separating means by an output signal of said second separating means;
    obtaining means for separating and obtaining two primary color signals corresponding to said remaining two additive primary colors from an output signal of said multiplying means and the output signal of said first separating means;
    a noise reduction circuit for reducing noise in said two primary color signals which are obtained from said obtaining means and for producing two primary color signals in which the noise has been reduced;
    third separating means for separating and deriving, from the output signal of the camera tube, a DC component signal containing signals corresponding to all of said three additive primary colors; and
    matrix means, responsive to the primary color signals from said noise reduction circuit and to the separated DC component signal from said third separating means, for producing three primary color signals,
    said noise reduction circuit comprising a first subtracting circuit supplied with the two primary color signals from said obtaining means for performing a subtracting operation between the signals supplied thereto, an amplitude limiter for amplitude-limiting an output signal of said first subtracting circuit to a level of a noise component which is included within the output signal of said first subtracting circuit, a second subtracting circuit supplied with a first primary color signal which is one of the primary color signals from said obtaining means and an output signal of said amplitude limiter for performing a subtracting operation between the signals supplied thereto, and a first adder supplied with a second primary color signal which is the other of the two primary color signals from said obtaining means and the output signal of said amplitude limiter for performing an adding operation between the signals supplied thereto, said second subtracting circuit and said first adder respectively producing the two primary color signals in which the noise has been reduced.

2. A color television signal generating apparatus as claimed in claim 1 in which said noise reduction circuit further comprises a second adder supplied with the two primary color signals from said obtaining means for performing an adding operation between the signals supplied thereto, a clipping circuit for clipping an output signal of said second adder to a predetermined level, and non-linear matrix circuit means supplied with output signals of said second subtracting circuit and said first adder for performing subtracting operations between the signals supplied thereto, said non-linear matrix circuit means having an output signal of said clipping circuit applied thereto as a control signal and varying the subtracting quantities which are used for the subtracting operations between the signals in response thereto, said non-linear matrix circuit means producing the two primary color signals in which the noise has been reduced and furthermore in which waveform distortions have been compensated for.

3. A color television signal generating apparatus as claimed in claim 2 in which said non-linear matrix circuit means comprises a first non-linear matrix circuit for subtracting an output second primary color signal of said first adder from an output first primary color signal of said second subtracting circuit and for varying the quantity of said second primary color signal in response to the control signal from said clipping circuit, and a second non-linear matrix circuit for subtracting the output first primary color signal of said second subtracting circuit from the output second primary color signal of said first adder and for varying the quantity of said first primary color signal in response to the control signal from said clipping circuit, said first and second non-linear matrix circuit respectively producing first and second primary color signals in which the noise has been reduced and the waveform distortions have been compensated for.

4. A color television signal generating apparatus as claimed in claim 2 in which said non-linear matrix circuit means is controlled so that a matrix ratio thereof representative of said subtracting quantities is constant when an input signal level is lower than said predetermined level and the matrix ratio decreases as the input level becomes greater than said predetermined level.

5. A color television signal generating apparatus as claimed in claim 1 in which said noise reduction circuit further comprises a clipping circuit supplied with the DC component signal from said third separating means for clipping the DC component signal to a predetermined level, and non-linear matrix circuit means supplied with output signals of said second subtracting circuit and said first adder for performing subtracting operations between the signals supplied thereto, said non-linear matrix circuit means having an output signal of said clipping circuit applied thereto as a control signal and varying the subtracting quantities which are used for the subtracting operations between the signals in response thereto, said non-linear matrix circuit means producing the two primary color signals in which the noise has been reduced and furthermore in which waveform distortions have been compensated for.

* * * * *